United States Patent
Imai

(10) Patent No.: US 10,536,401 B2
(45) Date of Patent: Jan. 14, 2020

(54) COMMUNICATION DEVICE, COMMUNICATION SYSTEM AND COMMUNICATION METHOD

(71) Applicant: NEC Corporation, Tokyo (JP)

(72) Inventor: Kiyotaka Imai, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/329,340

(22) PCT Filed: Aug. 17, 2015

(86) PCT No.: PCT/JP2015/004058
§ 371 (c)(1),
(2) Date: Jan. 26, 2017

(87) PCT Pub. No.: WO2016/027447
PCT Pub. Date: Feb. 25, 2016

(65) Prior Publication Data
US 2017/0237603 A1     Aug. 17, 2017

(30) Foreign Application Priority Data
Aug. 19, 2014 (JP) .................................. 2014-166677

(51) Int. Cl.
*H04L 12/939* (2013.01)
*H04L 12/26* (2006.01)

(52) U.S. Cl.
CPC .................................. *H04L 49/555* (2013.01)

(58) Field of Classification Search
CPC ..... H04L 49/555; H04L 43/12; H04L 43/026; H04L 43/0823
See application file for complete search history.

(56) References Cited

U.S. PATENT DOCUMENTS

2011/0055316 A1* 3/2011 Van der Merwe .......................... H04L 29/08729
709/203

2011/0173490 A1* 7/2011 Narayanaswamy .......................... H04L 63/1408
714/4.11

(Continued)

FOREIGN PATENT DOCUMENTS

CN     102138305 A     7/2011
CN     102484880 A     5/2012
(Continued)

OTHER PUBLICATIONS

Communication dated Mar. 5, 2018 from the European Patent Office in counterpart Application No. 15833688.3.
(Continued)

*Primary Examiner* — Andrew Lai
*Assistant Examiner* — Harry H Kim
(74) *Attorney, Agent, or Firm* — Sughrue Mion, PLLC

(57) ABSTRACT

A communication device has a configuration including a data analysis unit 1, a communication monitoring unit 2, and a management information transmission unit 3. The data analysis unit 1 extracts predetermined information from each of a plurality of packets input to the own device, analyzes the predetermined information of the plurality of packets, and generates information relating to a characteristic of each flow of the packets, as flow management information. The communication monitoring unit 2 detects that an abnormality occurs in communication of packets in a communication network to which the own device is connected. When the abnormality detection unit 2 detects the abnormality, the management information transmission unit 3 transmits predetermined information already extracted from a predetermined packet input before the detection of the abnormality, as information for generating the flow management information expected to be generated by the own device, to a standby-system device.

14 Claims, 8 Drawing Sheets

(56) References Cited

U.S. PATENT DOCUMENTS

| | | | |
|---|---|---|---|
| 2012/0099421 A1 | 4/2012 | Hayashitani | |
| 2013/0076531 A1* | 3/2013 | San Vicente | A61B 5/0015 |
| | | | 340/870.02 |
| 2013/0258843 A1 | 10/2013 | Kurita | |
| 2014/0317438 A1* | 10/2014 | Ripoll | G06F 11/2035 |
| | | | 714/4.11 |
| 2016/0234058 A1* | 8/2016 | Shi | H04L 12/6418 |

FOREIGN PATENT DOCUMENTS

| | | |
|---|---|---|
| CN | 103795709 A | 5/2014 |
| CN | 103957134 A | 7/2014 |
| EP | 2 343 864 A2 | 7/2011 |
| JP | 2001-007851 | 1/2001 |
| JP | 2006-229399 | 8/2006 |
| JP | 2013-179430 | 9/2013 |
| JP | 2013-207748 A | 10/2013 |
| KR | 1020070120737 A | 12/2007 |
| WO | 2012/098786 A1 | 7/2012 |
| WO | 2013/133400 A1 | 9/2013 |

OTHER PUBLICATIONS

International Search Report, PCT/JP2015/004058, dated Sep. 29, 2015.
Communication dated Sep. 5, 2017 from the Japanese Patent Office in counterpart Application No. 2016-543809.
Communication dated Sep. 3, 2018 from the Korean Intellectual Property Office in counterpart application No. 10-2017-7004568.
Communication dated Jun. 28, 2019, from the State Intellectual Property Office of the P.R.C. in application No. 201580044470.

\* cited by examiner

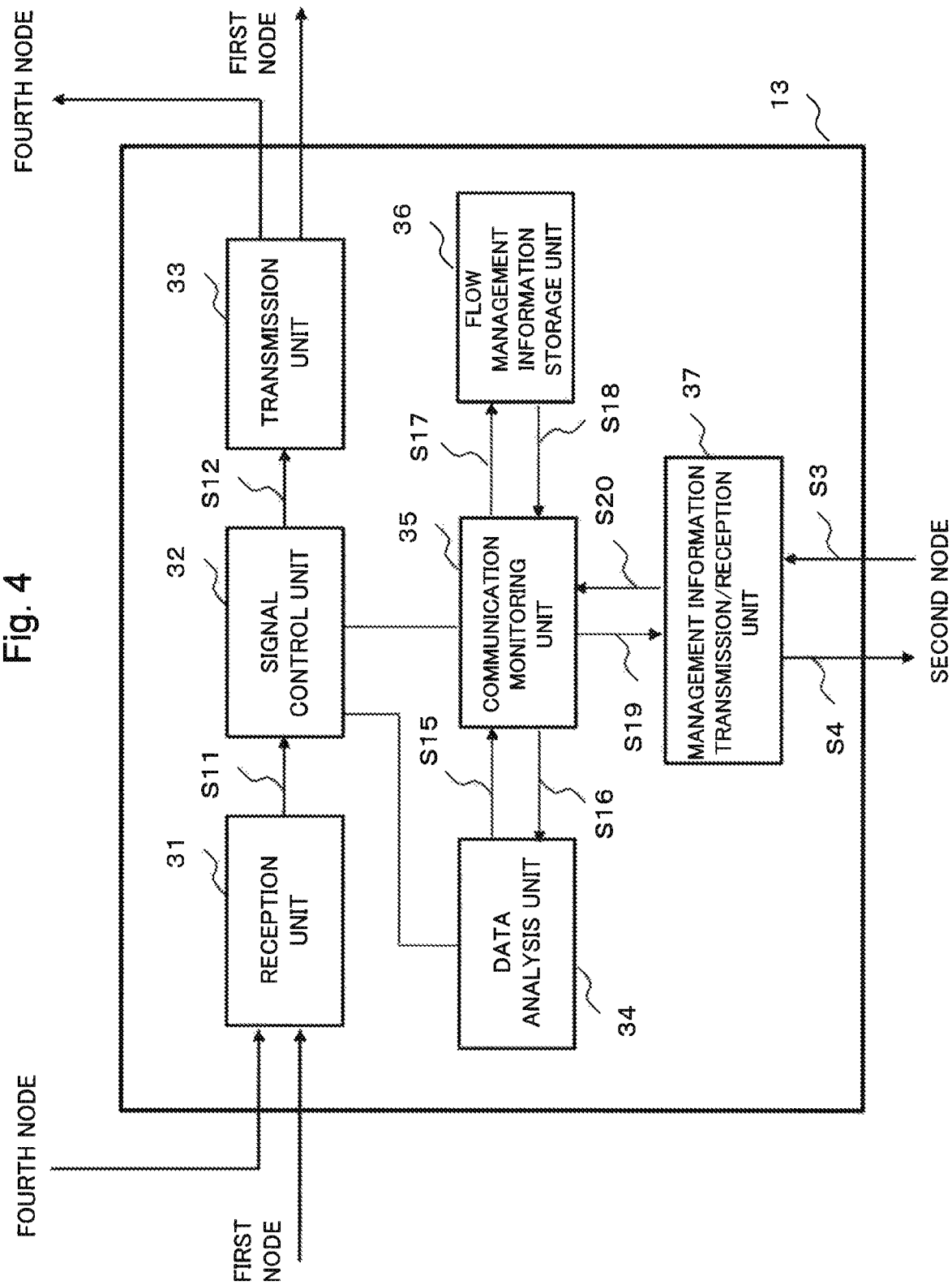

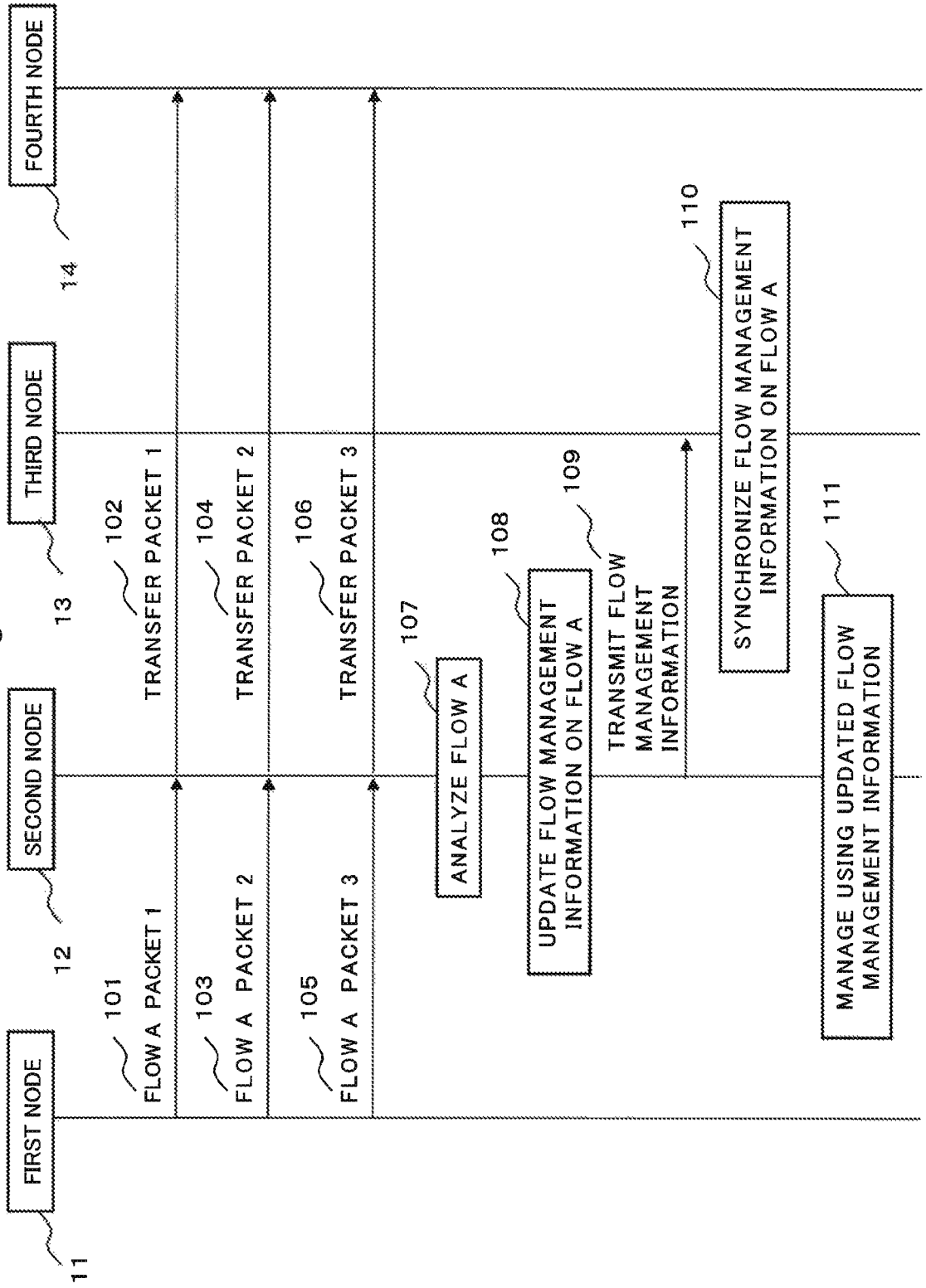

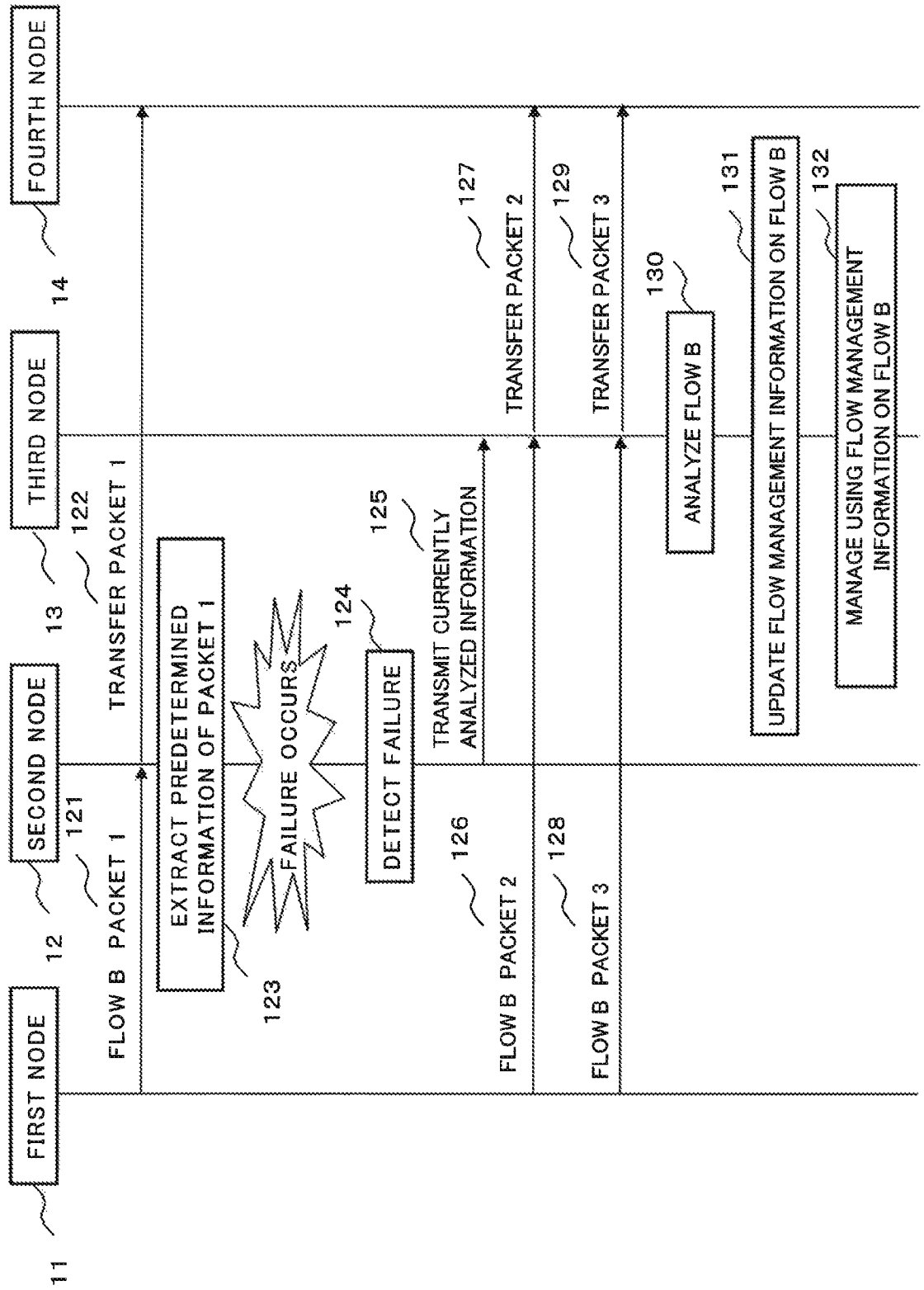

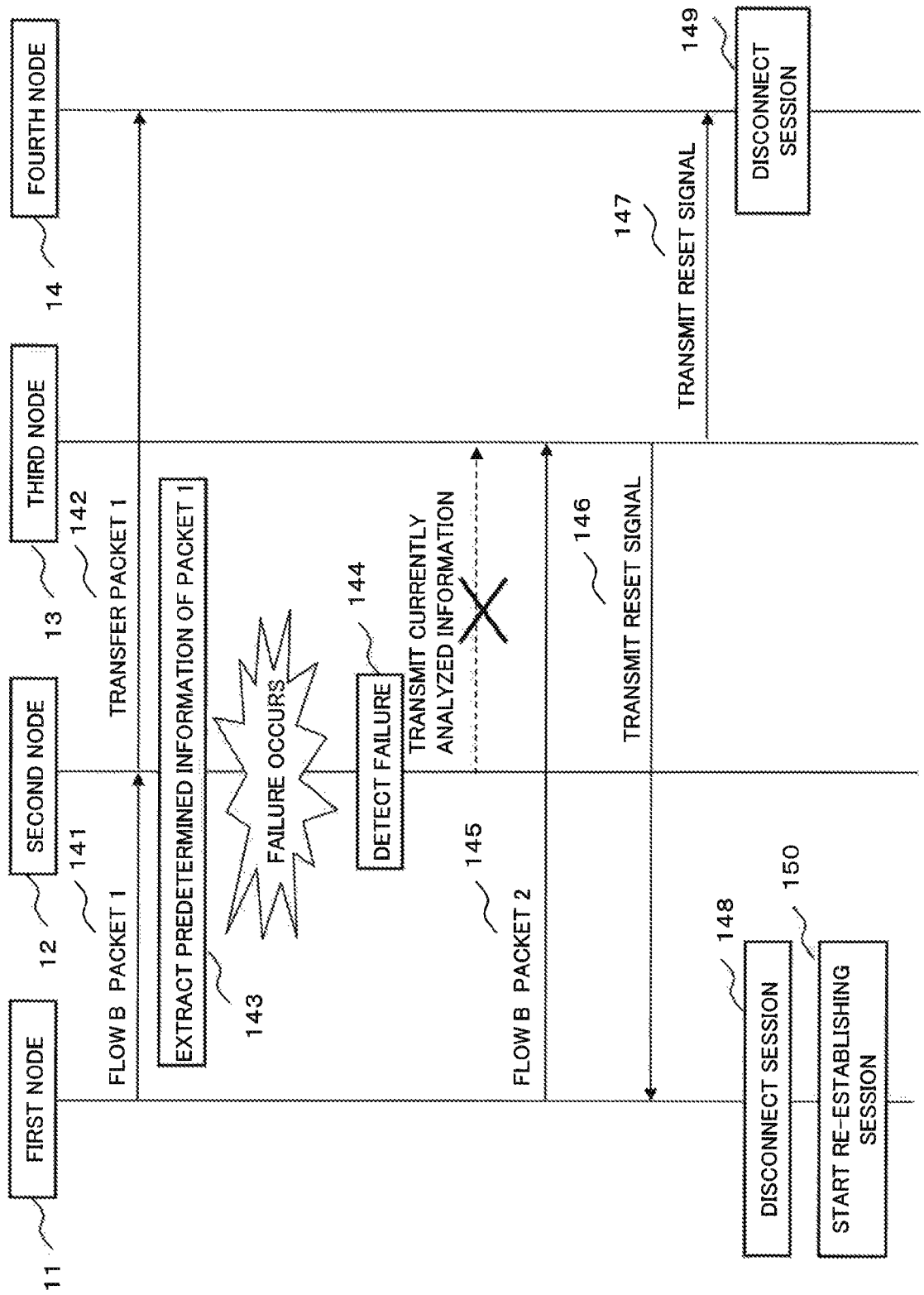

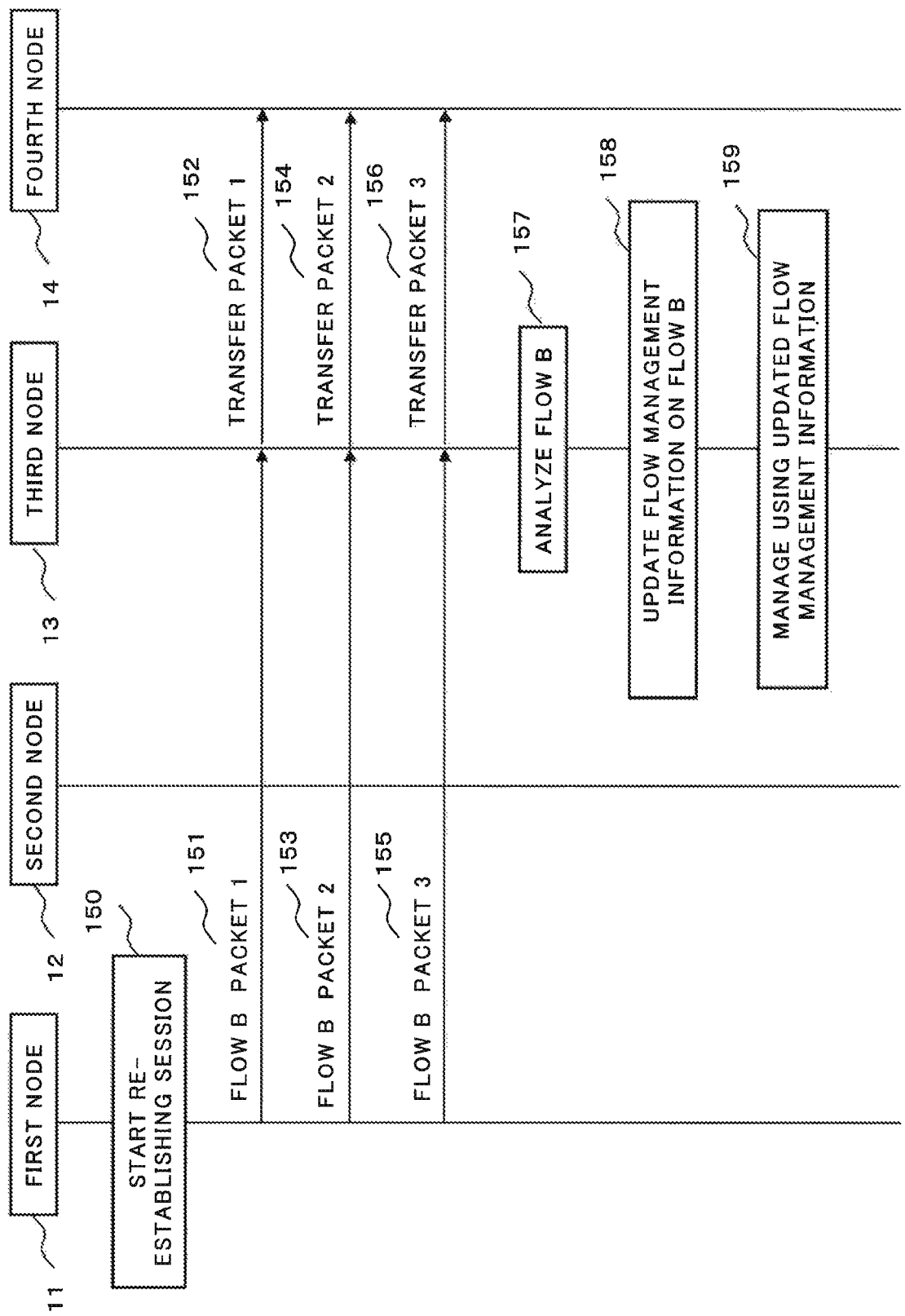

COMMUNICATION DEVICE, COMMUNICATION SYSTEM AND COMMUNICATION METHOD

TECHNICAL FIELD

The present invention relates to a communication device, and relates particularly to a technique of sharing information between redundantly configured communication devices.

BACKGROUND ART

Social importance of a communication network has become greater with development of an information communication society, and a demand for communication quality and availability of the communication network is increasing. It is necessary for a communication network to perform control and management of communication in order to ensure communication quality and availability. Thus, each of communication devices constituting a communication network has information for performing control and management of communication of data passing therethrough. For example, in a communication network where communication is performed using a packet format, each of communication devices has information relating to a flow of packets. A flow indicates a group of packets having a common attribute, for example, a group of packets having transmission source and destination addresses and a protocol in common. Each of the communication devices such as relay devices constituting the communication network performs control and management of communication by, for example, controlling a communication amount and stopping communication for each flow based on flow information. Each of the communication devices constituting the communication network becomes capable of performing control and management of communication for each flow by analyzing packets passing through the own device and obtaining flow information.

In addition, as a method for enhancing availability of a communication network, for example, there is a method of using redundantly configured communication devices and lines constituting a communication network. In a communication network redundantly including an active system and a standby system, where switching to the standby system is performed in a case of an abnormality in the active system, it is preferable for the switching in the case to be performed in a short time. Thus, a communication device included as the standby system may sometimes be required to be communicable within a short time on the same condition as that of the active system before occurrence of a failure. In a redundant communication system, in order to perform switching from an active system to a standby system due to occurrence of a failure or the like while maintaining a previous communication state, it is necessary for information that each of communication devices includes to be shared between a switching source and a switching destination. Thus, a technique for sharing information between an active-system communication device and a standby-system communication device in a redundant communication system has been developed. As a technique for sharing information between an active-system communication device and a standby-system communication device in a redundant communication system, for example, a technique as in PTL 1 is disclosed.

The technique in PTL 1 relates to a connection-type communication system in which communication devices as terminating devices are redundant. The communication system in PTL 1 includes an active-system terminating device and a standby-system terminating device. The active-system terminating device transmits, upon establishment of connection with a communication device being a transmission source, an address, an initial value of a sequence number, and the like of a communication-source communication device to the standby-system terminating device. In addition, the active-system terminating device transmits an incremental value of the sequence number to the standby-system terminating device when communicating with the transmission source. By transmitting the address, the sequence number, and the like of the transmission source from the active-system terminating device to the standby-system terminating device in this way, the standby-system terminating device is able to share the same information as that of the active-system terminating device. In a case of a failure in the active system, the standby-system terminating device establishes pseudo connection based on the information taken over from the active system and starts communication without newly performing communication for establishing connection with the transmission source. PTL 1 describes that the takeover of communication in this way makes it possible to hand over communication processing to the standby system without making an own-device application module and a communication partner aware of the takeover.

In addition, PTL 2 discloses a technique relating to a communication device having a function of detecting an abnormality in a relay device in a communication network.

CITATION LIST

Patent Literature

[PTL 1] Japanese Unexamined Patent Application Publication No. 2001-007851
[PTL 2] Japanese Unexamined Patent Application Publication No. 2006-229399

SUMMARY OF INVENTION

Technical Problem

However, the technique in PTL 1 is insufficient in the following point. In the communication system in PTL 1, information relating to connection established by the active-system terminating device is shared by being transmitted to the standby-system terminating device. A signal when the connection is established is transmitted and received in accordance with a predetermined signal format, and each of the communication devices is capable of obtaining the information directly from a content of the signal substantially simultaneously with the reception of the signal. On the other hand, flow information or the like to be used in control and management of communication is information that is obtained by analyzing a plurality of packets. Thus, it requires time to complete analysis of each flow, and there is a case in which a failure may occur during flow analysis in the active-system communication device and switching to the standby system may be performed.

Assume that a failure occurs after analyzing one packet P1 when three packets, for example, P1, P2, and P3 are necessary for specifying a flow, and a role is handed over to the standby-system communication device. In such a case, flow information cannot be handed over from the active system to the standby system since the analysis is incomplete. When flow information cannot be taken over, the standby-system communication device is required to independently analyze packets passing through the own device and generate flow information. The standby-system communication device is unable to receive packet P1 that has already been received by the active system. Thus, when performing flow analysis by the own device, the standby-system communication device is supposed to perform flow analysis by using a set of three packets, for example, P2, P3, and P4, which are different from a case in which the active system continues the analysis as it is. Since the standby-system communication device performs flow analysis based on a combination of packets different from a case in which the active system continues the analysis as it is, there may arise a case in which flow information to be obtained as a result of the analysis is also different.

Since control and management of communication are performed based on a result of the flow analysis, the different flow information may become a factor for communication quality control different from an operator's intention and communication stop. In order to avoid such a state, it is preferable that information to be obtained may be the same between cases in which the active system continues analysis and in which the standby system newly performs analysis. However, since the technique in PTL 1 only transmits information obtained directly from a signal but does not enable sharing or the like of information currently in the middle of analysis on a flow of packets, there is a possibility that the same flow information may not be obtained between the active system and the standby system.

In addition, the communication device in PTL 2 does not have such a function of mutually sharing data collected through flow analysis by each of the devices, either. Therefore, each of the techniques in PTL 1 and PTL 2 is insufficient as a technique for use in a communication system that is desired to reliably share flow information between an active system and a standby system.

An object of the present invention is to obtain a communication device capable of sharing the same information on a flow of packets with a standby-system communication device included for redundancy and performing switching to the standby system while maintaining the same communication state during a failure.

Solution to Problem

In order to solve the above-described problem, a communication device according to the present invention includes a data analysis means, a communication monitoring means, and a management information transmission means. The data analysis means extracts predetermined information from each of a plurality of packets being input to the own device, analyzes the predetermined information of each of the plurality of packets, and generates information relating to a characteristic of each flow of the packets, as flow management information. The communication monitoring means detects that an abnormality occurs in communication of the packets in a communication network to which the own device is connected. When the abnormality detection means detects the abnormality, the management information transmission means transmits the predetermined information already extracted from the predetermined packet input before the detection of the abnormality, as information for generating the flow management information expected to be generated by the own device, to a standby-system device.

In addition, a communication method according to the present invention includes extracting predetermined information from each of a plurality of packets being input to the own device, analyzing the information of each of the plurality of packets, and generating information relating to a characteristic of each flow of the packets, as flow management information. In addition, the communication method according to the present invention includes detecting that an abnormality occurs in communication of the packets in a communication network to which the own device is connected. In addition, the communication method according to the present invention includes, when the abnormality is detected, transmitting the predetermined information already extracted from the predetermined packet input before the detection of the abnormality, as information for generating the flow management information expected to be generated by the own device, to a standby-system device.

Advantageous Effects of Invention

The present invention enables switching to a standby-system communication device while maintaining the same communication state during a failure.

BRIEF DESCRIPTION OF DRAWINGS

FIG. 4 is a diagram illustrating an outline of a configuration of a device according to the second example embodiment of the present invention;

FIG. 5 is a diagram illustrating an outline of an operation flow according to the second example embodiment of the present invention;

FIG. 6 is a diagram illustrating an outline of an operation flow according to the second example embodiment of the present invention;

FIG. 7 is a diagram illustrating an outline of an operation flow according to a third example embodiment of the present invention; and FIG. 8 is a diagram illustrating an outline of an operation flow according to the third example embodiment of the present invention.

DESCRIPTION OF EMBODIMENTS

First Example Embodiment

Figure 1:
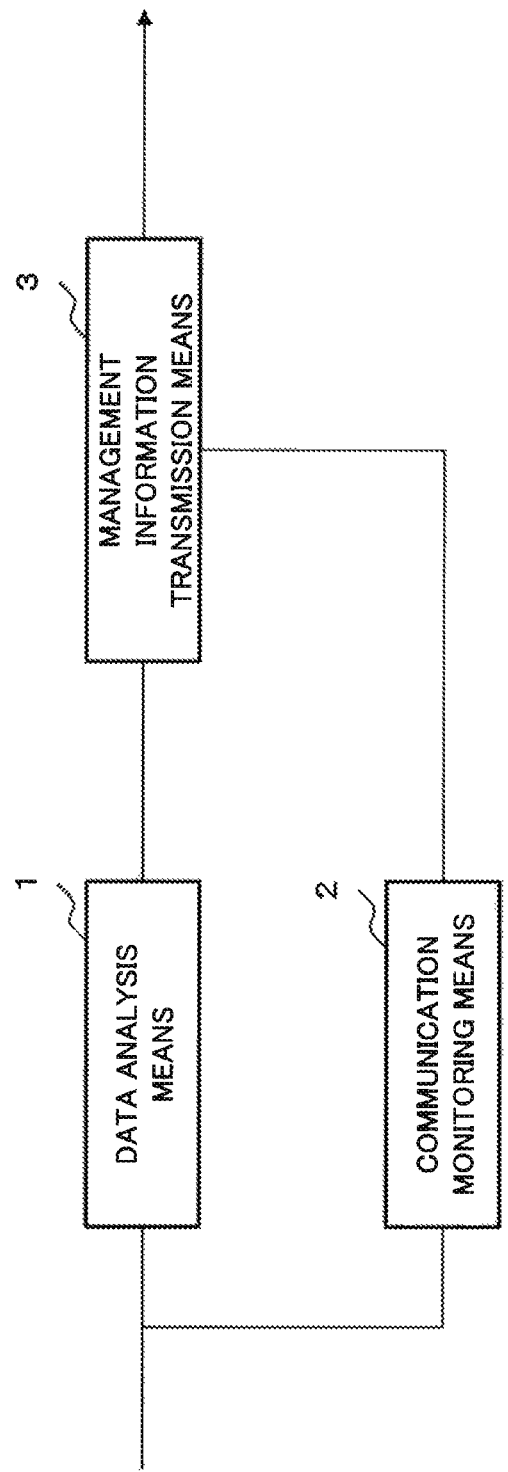
FIG. 1 is a diagram illustrating an outline of a configuration according to a first example embodiment of the present invention.

A first example embodiment of the present invention is described in detail with reference to the drawings. FIG. 1 illustrates an outline of a configuration of a communication device according to the present example embodiment. The communication device according to the present example embodiment includes a data analysis means 1, a communication monitoring means 2, and a management information transmission means 3.

The data analysis means 1 extracts predetermined information from each of a plurality of packets being input to the own device, analyzes the predetermined information of each of the plurality of packets, and generates information relating to a characteristic of each flow of the packets as flow management information. The communication monitoring means 2 detects that an abnormality has occurred in communication of the packets in a communication network to which the own device is connected. When the abnormality detection means 2 detects the abnormality, the management information transmission means 3 transmits the predetermined information already extracted from the predetermined packet input before the detection of the abnormality, as information for generating the flow management information expected to be generated by the own device, to a standby-system device.

In the communication device according to the present example embodiment, the data analysis means 1 extracts predetermined information from each of a plurality of packets being input to the own device and generates flow management information. In addition, when the communication monitoring means 2 detects that an abnormality has occurred in communication, the management information transmission means 3 transmits the predetermined information already extracted from the predetermined input packet, as information for generating the flow management information expected to be generated by the own device, to a standby-system device.

In the communication device according to the present example embodiment, a standby-system device becomes capable of generating flow management information expected to be generated by the own device by transmitting predetermined information already extracted from a packet to the standby-system device. Accordingly, the standby-system device side becomes capable of generating flow management information that is the same information as information that would have been obtained by the active-system communication device when no failure has occurred. Therefore, since the communication device according to the present example embodiment is able to take over information for performing communication to the standby-system device while maintaining the same communication state as the own device, switching to the standby-system communication device while maintaining the same communication state during a failure becomes possible.

Second Example Embodiment

Figure 2:
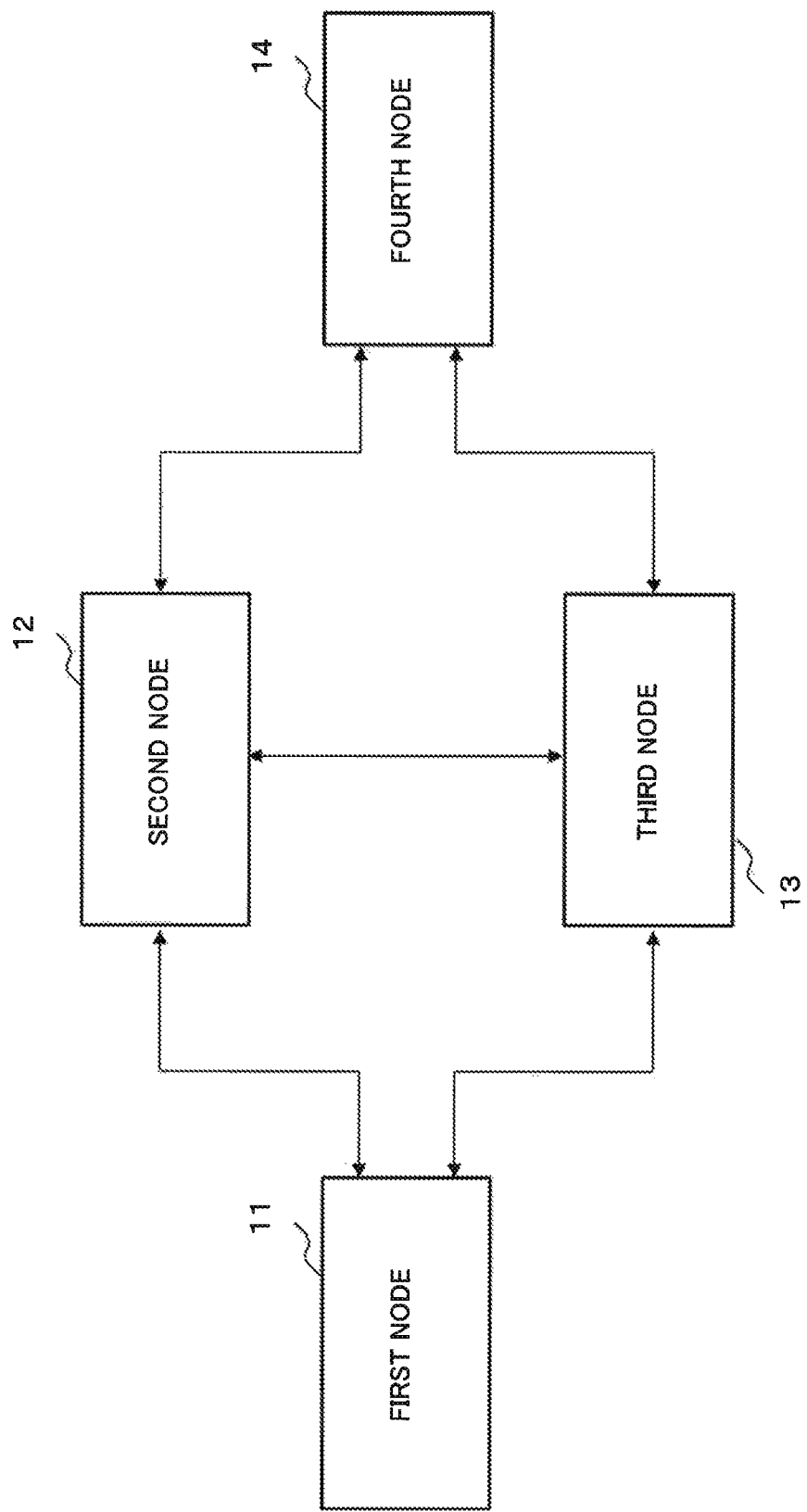
FIG. 2 is a diagram illustrating an outline of a configuration according to a second example embodiment of the present invention.

A second example embodiment of the present invention is described in detail with reference to the drawings. FIG. 2 illustrates an outline of a configuration of a communication system according to the present example embodiment.

The communication system according to the present example embodiment includes a first node 11, a second node 12, a third node 13, and a fourth node 14. The first node 11 and the second node 12, and the second node 12 and the fourth node 14 are connected respectively by bidirectionally communicable communication lines. Similarly, the first node 11 and the third node 13, and the third node 13 and the fourth node 14 are also connected respectively by bidirectionally communicable communication lines. In addition, the second node 12 and the third node 13 are also connected by a bidirectionally communicable communication line. In the present example embodiment, the nodes are connected in respective communication directions by a communication line using optical fiber. Between the nodes, a relay device or the like may be further included. In addition, communication between the nodes may be performed by wireless communication, or by a combination of wireless communication and other communication schemes.

In the example embodiment, a communication path formed by the first node 11, the second node 12 and the fourth node 14 is set as an active system, and a communication path formed by the first node 11, the third node 13 and the fourth node 14 is set as a standby system. In other words, in the present example embodiment, the second node 12 is included as a relay device in the active system and the third node 13 is included as a relay device in the standby system. The setting of the active-system communication path and the standby-system communication path may be reversed. In this case, the third node 13 serves as a relay device in the active system and the second node 12 serves as a relay device in the standby system.

For simplicity, the following description of the present example embodiment assumes that transmission of data is performed from the first node 11 side to the fourth node 14 side. In other words, the first node 11 has a function as a transmission device for transmitting, correspondingly to a destination, packets input from another communication network or information device connected to the own device. In addition, the fourth node 14 has a function as a reception device for outputting received packets to another communication network, information device or the like connected thereto. Since bidirectional communication is possible, the configuration may be such that data can be transmitted from the fourth node 14 side to the first node 11 side. In this case, the first node 11 has a function as a reception device and the fourth node has a function as a transmission device.

Figure 3:
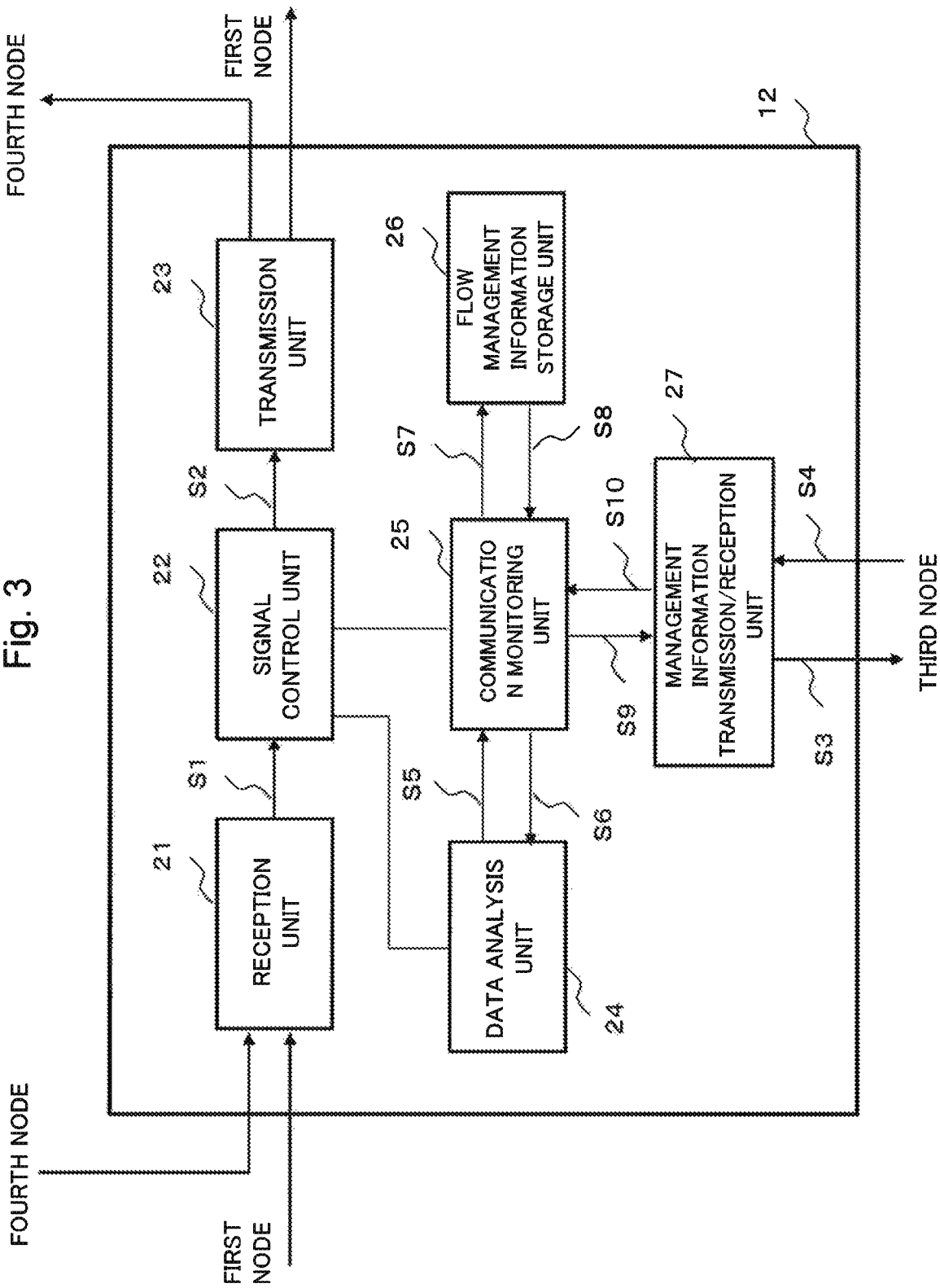
FIG. 3 is a diagram illustrating an outline of a configuration of a device according to the second example embodiment of the present invention.

A configuration of the second node 12 included as a relay device is described in detail with reference to FIG. 3. FIG. 3 illustrates an outline of a configuration of a node used as the second node 12. As illustrated in FIG. 3, the second node 12 includes a reception unit 21, a signal control unit 22, a transmission unit 23, a data analysis unit 24, a communication monitoring unit 25, a flow management information storage unit 26, and a management information transmission/reception unit 27.

The reception unit 21 has a function of receiving signals from other nodes and converting each of the signals into a signal form for use in the own device, in other words, the second node 12. The reception unit 21 according to the present example embodiment receives optical signals from the first node 11 and the fourth node 14 via ports corresponding to the respective communication lines, and converts each of the received optical signals into an electrical signal. The reception unit 21 performs decoding or the like of the signal converted into the electrical signal, and sends the signal, as a reception signal S1, to the signal control unit 22.

The signal control unit 22 has a function of discriminating destinations of received packets and transferring each of the packets to a connection destination corresponding to each of the destinations. The signal control unit 22 checks information on a destination of each packet received as a reception signal S1, and performs processing such as determination of a transmission destination of the packet. The signal control unit 22 sends the packet subjected to the processing such as determination of a transmission destination, as a signal for transmission S2, to the transmission unit 23.

The transmission unit 23 has a function of converting signals of a format for use in the second node 12 into signals that conform to standards of respective communication lines and outputting the signals. The transmission unit 23 has a function of generating optical signals for transmission based on data received as a signal for transmission S2 and outputting the optical signals to respective communication lines via ports respectively corresponding to nodes of transmission destinations. The transmission unit 23 according to the present example embodiment transmits optical signals to the first node 11 and the fourth node 14 via the respective communication lines.

The data analysis unit 24 has a function of extracting predetermined information from each of packets being processed by the signal control unit 22 and generating flow management information. The flow management information indicates information relating to a packet flow used as a basis for management and control of communication by each node. A flow according to the present example embodiment indicates a group of packets having an attribute in common, for example, a group of packets having transmission source and destination addresses and a protocol in common. The flow management information is constituted by information representing a characteristic of a flow, in other words, an attribute that is common in packets belonging to an identical flow. For example, the flow management information is constituted by information on an identifier for identifying a flow, transmission source and destination addresses of each flow, and a protocol of packets. When the flow management information has such a constitution, packets belonging to an identical flow have information in common on transmission source and destination addresses and a protocol of packets.

The data analysis unit 24 extracts information on, for example, a type of packets, a transmission source address and a transmission destination address, as predetermined information, from each of packets. The data analysis unit 24 generates, based on the predetermined information extracted from each of the plurality of packets, information that is common in each flow of the packets, as flow management information that is information representing a characteristic of a flow.

Upon receiving a signal indicating that an abnormality of a communication failure has been detected as an analysis unit control signal S6 from the communication monitoring unit 25, the data analysis unit 24 outputs information under analysis, in other words, predetermined information extracted from a packet before the reception, as an analysis data signal S5, to the communication monitoring unit 25. In addition, the data analysis unit 24 additionally includes a function of generating flow management information based on information under analysis received from another communication device and information extracted from a packet having passed through the own device.

The communication monitoring unit 25 has a function of monitoring a communication state of the own device and controlling communication. The communication monitoring unit 25 performs control and management of communication of each flow by referring to flow management information stored in the flow management information storage unit 26. In addition, the communication monitoring unit 25 monitors a state of signal processing in the signal control unit 22 and monitors whether the processing is performed normally. The communication monitoring unit 25 determines that there is an abnormality of a failure occurring in communication when, for example, transmission and reception of a control signal have failed to be normally performed and when predetermined processing has not been finished within a preset time interval.

Upon detecting an abnormality, the communication monitoring unit 25 sends, to the data analysis unit 24, a signal requesting for data relating to a currently analyzed flow, as an analysis unit control signal S6. In addition, the communication monitoring unit 25 sends, to the management information transmission/reception unit 27, currently analyzed data that is sent as an analysis data signal S5 from the data analysis unit 24, as a management information transmission signal S9.

In addition, when receiving flow management information from the data analysis unit 24, the communication monitoring unit 25 sends the received data, as an information storage unit control signal S7, to the flow management information storage unit 26. The communication monitoring unit 25 sends the flow management information as a management information transmission signal S9 to the management information transmission/reception unit 27 in order to share the flow management information with the third node 13.

Upon receiving flow management information of the third node 13 as a management information reception signal S10, the communication monitoring unit 25 sends the received data to the data analysis unit 24 or the flow management information storage unit 26. When the management information reception signal S10 is information under analysis, the communication monitoring unit 25 sends the received data to the data analysis unit 24. When the management information reception signal S10 is already analyzed flow management information, the communication monitoring unit 25 sends the received data to the flow management information storage unit 26.

The flow management information storage unit 26 has a function of storing flow management information. Upon receiving flow management information and a signal requesting for storage thereof as an information storage unit control signal S7 from the communication monitoring unit 25, the flow management information storage unit 26 stores the received flow management information. In addition, upon receiving a signal requesting for output of flow management information as an information storage unit control signal S7 from the communication monitoring unit 25, the flow management information storage unit 26 sends the stored flow management information, as a flow management information signal S8, to the communication monitoring unit 25.

The management information transmission/reception unit 27 has a function of transmitting data of flow management information or currently analyzed data to a node with which flow management information or currently analyzed information is shared, in other words, to the third node 13. In addition, the management information transmission/reception unit 27 has a function of receiving data of flow management information or currently analyzed data from another node, in other words, from the third node 13. Upon receiving flow management information or the like as a management information transmission signal S9 from the communication monitoring unit 25, the management information transmission/reception unit 27 transmits the received information as an active-side management information signal S3, to the third node 13. In addition, upon receiving flow management information or the like as a standby-side management information signal S4, from the third node 13, the management information transmission/reception unit 27 sends the received information as a management information reception signal S10, to the communication monitoring unit 25.

FIG. 4 illustrates an outline of a configuration of the third node 13 used as a standby-system relay device in the communication system according to the present example embodiment. As illustrated in FIG. 4, the configuration of the third node 13 is similar to that of the second node 12. In other words, the third node 13 includes a reception unit 31, a signal control unit 32, a transmission unit 33, a data analysis unit 34, a communication monitoring unit 35, a flow management information storage unit 36, and a management information transmission/reception unit 37. The reception unit 31, the signal control unit 32, the transmission unit 33, the data analysis unit 34, the communication monitoring unit 35, the flow management information storage unit 36, and the management information transmission/reception unit 37 have configurations and functions being similar to those of the corresponding units given the same names in the second node 12.

A reception signal S11, a signal for transmission S12, an analysis data signal S15, an analysis unit control signal S16, an information storage unit control signal S17, and flow management information signal S18 in the third node 13 have configurations and functions being similar to those of the corresponding signals given the same names in the second node 12. In addition, a management information transmission signal S19 and a management information reception signal S20 have configurations and functions being similar to those of the corresponding signals given the same names in the second node 12. A standby-side management information signal S4 is a signal to be transmitted from the management information transmission/reception unit 37 to the second node 12. In addition, an active-side management information signal S3 is a signal to be received by the management information transmission/reception unit 37 from the second node 12. The active-side management information signal S3 and the standby-side management information signal S4 respectively correspond to signals given the same names and transmitted and received by the second node 12.

Since the second node 12 and the third node 13 have the similar configurations and functions, the communication system according to the present example embodiment is capable of switching between an active system and a standby system and subsequently switching again to communication using a path of the first one after resolving a failure.

An operation of the communication system according to the present example embodiment is described. FIG. 5 illustrates an outline of an operation in flow analysis based on packets being input to the second node 12 when none of a communication failure, a device abnormality and the like occurs, the analysis being performed by the second node 12 that is an active-system relay device in the communication system according to the present example embodiment.

The first node 11 transmits, to the second node 12, packet 1 addressed to the fourth node 14 (Step 101). Upon receiving packet 1 at the reception unit 21, the second node 12 performs processing such as decoding of a received signal and sends data of packet 1 as a reception signal S1, to the signal control unit 22. Upon determining that packet 1 is a packet addressed to the fourth node 14, the signal control unit 22 sends the data of packet 1 as a signal for transmission S2, to the transmission unit 23 for the purpose of transmission to the fourth node 14. Upon receiving packet 1 as the signal for transmission S2, the transmission unit 23 of the second node 12 converts the signal into a predetermined signal format and transmits packet 1 to the fourth node 14. By the operation described above, the second node 12 transfers the received packet 1 to the fourth node 14 (Step 102). Upon receiving packet 1, the fourth node 14 performs processing in accordance with a content of packet 1.

In addition, when the signal control unit 22 of the second node 12 performs processing of packet 1, the data analysis unit 24 monitors the packet processing of the signal control unit 22 and extracts predetermined information of packet 1. Upon extracting data of the predetermined information of packet 1, the data analysis unit 24 temporarily stores the extracted data. In the present example embodiment, the data analysis unit 24 extracts, from a packet, information including addresses of transmission source and destination of the packet and a type of the packet, as predetermined information. The predetermined information extracted by the data analysis unit 24 may include information on another item.

In a way similar to packet 1, the first node 11 transmits, to the second node 12, packet 2 addressed to the fourth node 14 (Step 103). Upon receiving packet 2, the second node 12 transfers packet 2 to the fourth node 14 being a destination (Step 104). When the second node 12 performs processing of packet 2, the data analysis unit 24 extracts data of predetermined information of packet 2 and temporarily stores the extracted data.

Similarly as for packet 3, the first node 11 transmits packet 3 to the second node 12 (Step 105), and the second node 12 determines a destination and transfers packet 3 to the fourth node 14 (Step 106). The data analysis unit 24 of the second node 12 extracts data of predetermined information from packet 3 and temporarily stores the extracted data.

Upon extracting data from each of packets of a predetermined number, the data analysis unit 24 of the second node 12 performs flow analysis based on the data of the temporality stored predetermined information (Step 107). In the present example embodiment, the data analysis unit 24 performs analysis based on packet 1, packet 2 and packet 3 to specify a flow. When the predetermined information is common among packet 1, packet 2 and packet 3, the data analysis unit 24 regards the packets as being packets of an identical flow and defines mutually associated information as being flow management information. In the present example embodiment, a flow that is specified by the analysis at Step 107 is referred to as flow A.

Upon specifying flow A, the data analysis unit 24 sends flow management information constituted by information on the specified flow A, as an analysis data signal S5, to the communication monitoring unit 25. Upon receiving the flow management information, the communication monitoring unit 25 sends the received information, as an information storage unit control signal S7, to the flow management information storage unit 26. Upon receiving the flow management information, the flow management information storage unit 26 updates flow management information on flow A based on the received information (Step 108). In addition, the communication monitoring unit 25 sends the received flow management information relating to flow A, as a management information transmission signal S9, to the management information transmission/reception unit 27. Upon receiving the flow management information, the management information transmission/reception unit 27 transmits the flow management information relating to flow A, as an active-side management information signal S3, to the third node 13 (Step 109).

Upon receiving the flow management information on flow A, as the active-side management information signal S3, from the second node 12, the management information transmission/reception unit 37 of the third node 13 sends the received information, as a management information reception signal S20, to the communication monitoring unit 35. Upon receiving the flow management information on flow A, the communication monitoring unit 35 sends the received information, as an information storage unit control signal S17, to the flow management information storage unit 36. Upon receiving the flow management information on flow A, the flow management information storage unit 36 updates flow management information on flow A based on the received information. By the third node 13 storing the flow management information received from the second node 12, synchronization of the flow management information on flow A between the second node 12 and the third node 13 is completed (Step 110). In other words, synchronization regarding the flow management information on flow A between the nodes of the active system and the standby system is completed.

The communication monitoring unit 25 of the second node 12 performs control and management of communication by using the updated flow management information (Step 111). When there are other different flows, the second node 12 performs synchronization of flow management information with the third node 13 by generating and updating flow management information for each of the flows.

Next, an operation when an abnormality of a communication failure occurs in the active system during flow analysis and switching from the second node 12 to the standby-system third node 13 is performed is described. FIG. 6 illustrates an outline of an operation flow when an abnormality is detected in the active system during flow analysis and switching from the active system to the standby system is performed in the communication system according to the present example embodiment. In the following, description is given using an example of a case when a failure occurs after extraction of predetermined information from a first packet in an operation of specifying flow B whose flow can be specified from three packets.

The first node 11 transmits, to the second node 12, packet 1 addressed to the fourth node 14 (Step 121). Packet 1 is a first packet out of three packets necessary for analysis for generating flow management information on flow B. Upon receiving packet 1 at the reception unit 21, the second node 12 determines, at the signal control unit 22, that packet 1 is a packet addressed to the fourth node 14. Upon determining, at the signal control unit 22, that packet 1 is a packet addressed to the fourth node 14, the transmission unit 23 of the second node 12 transfers packet 1 to the fourth node 14 (Step 122). Upon receiving packet 1, the fourth node 14 performs processing in accordance with a content of packet 1.

In addition, when the signal control unit 22 of the second node 12 performs processing of packet 1, the data analysis unit 24 analyzes packet 1 and extracts predetermined information (Step 123). Upon extracting data of the predetermined information of packet 1, the data analysis unit 24 temporarily stores the extracted data.

Assume that a failure occurs in the active system of the communication system at a time of finishing the processing of packet 1, and packet communication on the active system side becomes impossible. When a failure occurs in the active system of the communication system, the communication monitoring unit 25 of the second node 12 detects the occurrence of the abnormality (Step 124). Upon detecting the occurrence of the abnormality, the communication monitoring unit 25 sends, to the data analysis unit 24, an analysis unit control signal S6 requesting for currently analyzed flow management information. The currently analyzed flow management information is constituted by predetermined information extracted from each of packets.

Upon receiving an instruction for outputting currently analyzed flow management information, the data analysis unit 24 sends the information extracted from packet 1, as an analysis data signal S5, to the communication monitoring unit 25. Upon receiving the information extracted from packet 1, the communication monitoring unit 25 sends the received information, as a management information transmission signal S9, to the management information transmission/reception unit 27. When the analysis has been finished only for packet 1, the flow management information is constituted by the predetermined information extracted from packet 1. Upon receiving the currently analyzed flow management information, the management information transmission/reception unit 27 transmits the received information, as an active-side management information signal S3, to the third node 13 (Step 125).

Upon receiving the currently analyzed flow management information as the active-side management information signal S3, the management information transmission/reception unit 37 of the third node 13 sends the received information, as a management information reception signal S20, to the communication monitoring unit 35. In addition, the communication monitoring unit 35 sends the received currently analyzed flow management information, as an analysis unit control signal S16, to the data analysis unit 34. Upon receiving the currently analyzed flow management information, in other words, the predetermined information extracted from the packet at the second node 12, the data analysis unit 34 temporarily stores the received information.

Upon detecting a failure, the first node 11 changes a transmission destination of a packet into a path of the standby system on the third node 13 side. The first node 11 transmits, to the third node 13, a next-to-be-transmitted packet 2 addressed to the fourth node 14 (Step 126).

Upon receiving packet 2, the third node 13 transfers packet 2 to the fourth node 14 being a destination (Step 127). When the third node 13 performs processing of packet 2, the data analysis unit 34 of the third node 13 extracts data of predetermined information of packet 2 and temporarily stores the extracted data.

In addition, similarly as for packet 3, the first node 11 sends packet 3 to the third node 13 (Step 128), and the third node 13 determines a destination and transfers packet 3 to the fourth node 14 (Step 129). The data analysis unit 34 of the third node 13 extracts data of predetermined information from packet 3 and temporarily stores the extracted data.

Upon storing a predetermined number of packets, the data analysis unit 34 of the third node 13 performs flow analysis based on both the information under analysis received from the second node 12 and the data extracted by the own device and temporarily stored therein (Step 130). In the example of the present example embodiment, the data analysis unit 34 of the third node 13 performs flow analysis based on both the predetermined information extracted from packet 1 by the second node 12 and the predetermined information extracted from each of packet 2 and packet 3 by the own device. When the predetermined information is common between the information under analysis received from the second node 12 and the information extracted by the own device, the data analysis unit 34 of the third node 13 specifies as being an identical flow. In the present example embodiment, a flow that is specified at Step 130 is referred to as flow B.

Upon specifying flow B, the data analysis unit 34 of the third node 13 sends flow management information, as an analysis data signal S15, to the communication monitoring unit 35. Upon receiving the flow management information on flow B, the communication monitoring unit 35 sends the received information, as an information storage unit control signal S17, to the flow management information storage unit 36. Upon receiving the flow management information, the flow management information storage unit 36 updates flow management information on flow B based on the received information (Step 131).

Upon the update of the flow management information, the communication monitoring unit 35 of the third node 13 performs management of communication by using the updated flow management information on flow B (Step 132). In addition, as for other flows such as flow A, the communication monitoring unit 35 performs management of communication based on flow management information already stored in the flow management information storage unit 36.

In the communication system according to the present example embodiment, when a failure occurs at the active-system second node 12, only information relating to a currently analyzed flow is taken over to the standby-system third node 13. Instead of such a configuration, the active-system second node 12 may transmit not only information on a currently analyzed flow but also information on other already analyzed flows to the standby-system third node 13 in the event of a failure. By transmitting the information on the other flows as well as the currently analyzed information, it becomes possible to reliably take over flow management information used in the active system in the event of a failure. In addition, an already analyzed flow to be taken over at this time may be limited to a new flow that has been updated within a predetermined time period. In addition, only information of a flow that has performed a predetermined amount or more of communication within a predetermined period may be taken over. The limitation on a flow to be taken over makes it possible to efficiently take over necessary information within a limited time in the event of a failure.

In the communication system according to the present example embodiment, node management information is transmitted and received between nodes via a management information transmission/reception unit. Instead of such a configuration, a transmission unit and a reception unit each communicating with other nodes may perform communication relating to sharing of currently analyzed and already analyzed flow management information between nodes of an active system and a standby system.

In the communication system according to the present example embodiment, flow management information is shared between a standby system and an active system by transmitting flow management information generated by the active-system second node 12 to the standby-system third node 13. When a failure occurs during analysis of a flow by the active-system second node 12 and communication and flow analysis cannot be continued, the second node 12 transmits currently analyzed flow management information to the standby-system third node 13. By the third node 13 taking over the information currently analyzed by the second node 12 and performing flow analysis on the information together with information extracted by the own device, it becomes possible to specify a flow based on information being same as that in a case when the second node 12 continues the flow analysis. Thus, the third node 13 becomes capable of generating flow management information similar to that in a case when the second node 12 continues the flow analysis.

For example, assume that when no failure occurs, the active-system second node 12 extracts predetermined information from each of three packets P1, P2 and P3 and performs flow analysis. When it is assumed that the active-system second node 12 extracts predetermined information from P1 being a first packet and thereafter switching to the standby system is performed without taking over currently analyzed information, the third node 13 is unable to receive packet P1. Thus, this results in the third node 13 performing flow analysis based on packets P2 and P3 and further another packet, for example, P4. In such a case, since the active-system second node 12 and the standby-system third node 13 each perform flow analysis based on different pairs of packets, flow information to be obtained may possibly be different.

On the other hand, in the communication system according to the present example embodiment, when detecting an abnormality in the active system, the second node 12 transmits predetermined information already extracted from packet P1 to the standby-system third node 13. Thus, the third node 13 is able to perform flow analysis based on both predetermined information of packets P2 and P3 that the own device directly extracts from received packets and the predetermined information of packet P1 that has been received from the second node 12. As a result, the third node 13 is able to perform flow analysis based on P1, P2 and P3 that are a combination of packets being same as a combination of packets assumed to be used for flow analysis by the second node 12 when no abnormality has occurred in the active system. Owing to the matching combination of packets used as a basis for flow analysis, the third node 13 is able to generate flow management information similar to flow management information expected to be generated by the second node 12 when no abnormality has occurred in the active system. Consequently, in the event of a failure, the standby-system third node 13 is able to continue control and management of communication based on flow management information similar to that of the active-system second node 12.

As described above, in the communication system according to the present example embodiment, switching of a relay device from an active system to a standby system in the event of a failure does not cause a change in a content of control and management of communication due to difference in flow management information. As a result, in the communication system according to the present example embodiment, it is possible to continue control and management of communication based on the same flow management information even when a failure occurs. By continuing control and management of communication based on the same flow management information, unexpected communication control and stop can be avoided.

Third Example Embodiment

A third example embodiment of the present invention is described in detail. A communication system according to the present example embodiment has, in addition to the function of the communication system according to the second example embodiment, a function of acquiring, again from the beginning by a standby-system side, information necessary for specifying a flow when transmission of information from a node in an active system to a node in a standby system is failed. The configuration of the communication system according to the present example embodiment is similar to that of the second example embodiment. In other words, the communication system according to the present example embodiment includes a first node 11, a second node 12, a third node 13, and a fourth node 14, and the nodes are connected by respective communication lines. In addition, at an initial state similar to the second example embodiment, the second node 12 is included as a relay device in the active system and the third node 13 is included as a relay device in the standby system. In the following, description about a part relating to the configuration of the communication system according to the present example embodiment is given with reference to FIGS. 2, 3 and 4.

The configuration of the communication system according to the present example embodiment and an operation thereof when no failure occurs are similar to those in the second example embodiment. In addition, in the communication system according to the present example embodiment, an operation of taking over currently analyzed information from the active-system second node 12 to the standby-system third node 13 when a failure occurs and generating flow management information by the third node 13 is also similar to that in the second example embodiment. Thus, in the following, only an operation when sharing of currently analyzed information is failed in the event of a failure and a node in a standby system updates flow management information is described with reference to FIGS. 7 and 8. In the following, description is given using an example of a case when a failure occurs in a communication network after analysis of a first packet when flow B is analyzed from three packets.

The first node 11 transmits, to the second node 12, packet 1 addressed to the fourth node 14 (Step 141). Upon receiving packet 1, the second node 12 transfers packet 1 to the fourth node 14 being a destination (Step 142). In addition, when performing processing of packet 1, the second node 12 extracts predetermined information from packet 1 (Step 143).

When a failure occurs in a communication network and the communication monitoring unit 25 of the second node 12 detects the occurrence of the abnormality (Step 144), the communication monitoring unit 25 starts an operation of transmitting currently analyzed data to the third node 13.

In addition, upon detecting the failure in the communication network, the first node 11 transmits, to the standby-system third node 13, packet 2 addressed to the fourth node 14 (Step 145). When the second node 12 fails to transmit the currently analyzed data upon detecting the abnormality at Step 144, the third node 13 receives packet 2 from the first node 11 prior to receiving the currently analyzed information relating to packet 1. Upon receiving packet 2 while having not received the currently analyzed information on packet 1, the third node 13 transmits a signal for resetting connection, as a reset signal, to the first node 11 (Step 146). In addition, the third node 13 also transmits a signal for resetting connection, as a reset signal, to the fourth node 14 (Step 147). When the communication system is based on Transmission Control Protocol (TCP), TCP RST can be used as a signal requesting for resetting connection.

Upon receiving the reset signal, the first node 11 disconnects a session with the fourth node 14 (Step 148). In addition, upon receiving the reset signal, the fourth node 14 also disconnects a session with the first node 11 (Step 149). Upon disconnecting a session at Step 148, the first node 11 starts an operation of re-establishing a session (Step 150).

Upon starting an operation of re-establishing a session, the first node 11 sends, to the third node 13, packet 1 addressed to the fourth node 14 (Step 151). Upon receiving packet 1, the third node 13 transfers packet 1 to the fourth node 14 being a destination (Step 152). When the third node 13 performs processing of packet 1, the data analysis unit 34 of the third node 13 extracts data of predetermined information of packet 1 and temporarily stores the extracted data.

In addition, similarly as for packet 2, the first node 11 sends packet 2 to the third node 13 (Step 153), and the third node 13 determines a destination and transfers packet 2 to the fourth node 14 (Step 154). The data analysis unit 34 of the third node 13 extracts data of predetermined information from packet 2 and temporarily stores the extracted data. Further, similarly as for packet 3, the first node 11 transmits packet 3 to the third node 13 (Step 155), and the third node 13 determines a destination and transfers packet 3 to the fourth node 14 (Step 156). The data analysis unit 34 of the third node 13 extracts data of predetermined information from packet 3 and temporarily stores the extracted data.

When pieces of data of a predetermined number are stored, the data analysis unit 34 of the third node 13 performs flow analysis based on the stored data of the predetermined information (Step 157). Upon specifying flow B and generating flow management information, the data analysis unit 34 sends the generated information, as an analysis data signal S15, to the communication monitoring unit 35. Upon receiving the flow management information on flow B, the communication monitoring unit 35 sends the received information, as an information storage unit control signal S17, to the flow management information storage unit 36. Upon receiving the flow management information on flow B, the flow management information storage unit 36 updates flow management information on flow B based on the received information (Step 158). Upon the update of the flow management information, the communication monitoring unit 35 performs control and management of communication by using the updated flow management information (Step 159). As for flow management information relating to other flows, communication management may be performed based on already stored flow management information, and updating of flow management information may be newly performed.

In the communication system according to the present example embodiment, when currently analyzed flow management information has failed to be taken over from the active-system second node 12 to the standby-system third node 13 in the event of a failure, the third node 13 requests a transmission source to transmit the same packet as that of the second node 12. By generating flow management information by the third node 13 based on a packet being identical to a packet assumed to be used in flow analysis by the second node 12 when no failure occurs, it is possible to use flow management information similar between before and after occurrence of a failure. As a result, in the communication system according to the present example embodiment, even when takeover of information to a standby system has been failed in the event of a failure, it is possible to continue communication control and management based on flow management information being same as that used in analysis by an active system.

A part or all of the above-described example embodiments can be described as the following supplementary notes, but the present invention is not limited to the following.

(Supplementary Note 1)

A communication device including:

a data analysis means for extracting predetermined information from each of a plurality of packets being input to the own device, analyzes the predetermined information of each of the plurality of packets, and generates information relating to a characteristic of each flow of the packets, as flow management information;

a communication monitoring means for detecting that an abnormality has occurred in communication of the packets in a communication network to which the own device is connected; and a management information transmission means for transmitting, when the abnormality detection means detects the abnormality, the predetermined information already extracted from the predetermined packet input before the detection of the abnormality, as information for generating the flow management information expected to be generated by the own device, to a standby-system device.

(Supplementary Note 2)

The communication device according to Supplementary note 1, wherein, when transmitting the predetermined information already extracted from the predetermined packet, the management information transmission means also transmits the flow management information on an already analyzed flow.

(Supplementary Note 3)

A communication device including:

a management information reception means for receiving, from another device, predetermined information extracted from a packet by the other device;

a packet information extraction means for extracting the predetermined information from each of a plurality of packets being input to the own device; and a flow information generation means for generating, from the predetermined information received from the other device and the predetermined information extracted by the packet extraction means, information relating to a characteristic of each flow of the packets, as flow management information.

(Supplementary Note 4)

The communication device according to Supplementary note 3, the communication device further including a transmission request means that transmits, when detecting the packet being input to the own device before the management information reception means receives the predetermined information from the other device, a signal requesting for transmission of a predetermined packet to a transmission source of the packet.

(Supplementary Note 5)

The communication device according to Supplementary note 3 or 4, wherein the management information reception means further includes, a communication control means for using the flow management information generated by the own device and the flow management information received from the other device in controlling communication of the packets, when receiving flow management information already analyzed by the other device as well as the predetermined information.

(Supplementary Note 6)

A communication system including:

a first relay device that is the communication device according to Supplementary note 1 or 2; and a second relay device that is the communication device according to any one of Supplementary notes 3 to 5, wherein, when the communication monitoring means being the first relay device detects an abnormality when the first relay device is used as an active system, the predetermined information extracted by the first relay device is transmitted from the first relay device to the second relay device.

(Supplementary Note 7)

A communication method including:

extracting predetermined information from each of a plurality of packets being input to an own device, analyzing the predetermined information of each of the plurality of packets, and generating information relating to a characteristic of each flow of the packets, as flow management information;

detecting that an abnormality has occurred in communication of the packets in a communication network to which the own device is connected; and transmitting, when the abnormality is detected, the predetermined information already extracted from the predetermined packet input before the detection of the abnormality, as information for generating the flow management information expected to be generated by the own device, to a standby-system device.

(Supplementary Note 8)

The communication method according to Supplementary note 7, wherein, when the predetermined information already extracted from the predetermined packet is transmitted, the flow management information on an already analyzed flow is also transmitted.

(Supplementary Note 9)

The communication method according to Supplementary note 7 or 8, wherein the transmitted predetermined information is received by the standby-system device;

the predetermined information is extracted from each of a plurality of packets input to the standby-system device; and information relating to a characteristic of each flow of the packets is generated as second flow management information, from the predetermined information received by the standby-system device and the predetermined information extracted from each of the packets input to the own device.

(Supplementary Note 10)

The communication method according to Supplementary note 9, wherein the standby-system device transmits, when detecting the packet being input to the own device before receiving the predetermined information, a signal requesting for transmission of a predetermined packet to a transmission source of the packet.

(Supplementary Note 11)

The communication method according to Supplementary note 9 or 10, wherein, when receiving the already analyzed flow management information as well as the predetermined information, the standby-system device uses the second flow management information generated by the own device and the received flow management information in controlling communication of the packets.

(Supplementary Note 12)

A communication method including:

receiving, from another device, predetermined information extracted from a packet by the other device;

extracting the predetermined information from each of a plurality of packets being input to an own device; and generating, from the predetermined information received from the other device and the predetermined information extracted from each of the packets input to the own device, information relating to a characteristic of each flow of the packets, as flow management information.

(Supplementary Note 13)

The communication method according to Supplementary note 12, wherein, when detecting the packet being input to the own device before receiving the predetermined information from the other device, a signal requesting for transmission of a predetermined packet is transmitted to a transmission source of the packet.

(Supplementary Note 14)

The communication method according to Supplementary note 12 or 13, wherein, when receiving flow management information already analyzed by the other device as well as the predetermined information, the flow management information generated by the own device and the flow management information received from the other device are used in controlling communication of the packets.

The present invention has been described using each of the example embodiments described above as an example embodiment. However, the present invention is not limited to the above-described example embodiments. In other words, various modes that a person skilled in the art can understand can be applied to the present invention within the scope of the present invention.

This application is based upon and claims the benefit of priority from Japanese Patent Application No. 2014-166677, filed on Aug. 19, 2014, the disclosure of which is incorporated herein in its entirety.

REFERENCE SIGNS LIST

1 Data analysis means
2 Communication monitoring means
3 Management information transmission means
11 First node
12 Second node
13 Third node
14 Fourth node
21 Reception unit
22 Signal control unit
23 Transmission unit
24 Data analysis unit
25 Communication monitoring unit
26 Flow management information storage unit
27 Management information transmission/reception unit
31 Reception unit
32 Signal control unit
33 Transmission unit
34 Data analysis unit
35 Communication monitoring unit
36 Flow management information storage unit
37 Management information transmission/reception unit
101-111 Operation step of communication system
121-132 Operation step of communication system
141-159 Operation step of communication system
S1 Reception signal
S2 Signal for transmission
S3 Active-side management information signal
S4 Standby-side management information signal
S5 Analysis data signal
S6 Analysis unit control signal
S7 Information storage unit control signal
S8 Flow management information signal
S9 Management information transmission signal
S10 Management information reception signal
S11 Reception signal
S12 Signal for transmission
S15 Analysis data signal
S16 Analysis unit control signal
S17 Information storage unit control signal
S18 Flow management information signal
S19 Management information transmission signal
S20 Management information reception signal

The invention claimed is:

1. A communication device connected to a communication network as a first communication device comprising:
at least one processor which:
extracts first predetermined information required for identifying a packet flow, which comprises a type of packets, a transmission source address and a transmission destination address, from each of a plurality of packets inputted from the communication network,
detects that an abnormality occurs in communication of the packets in the communication network, and
transmits, when detecting the abnormality during flow analysis, the first predetermined information to a second communication device as a standby-system device,
wherein the same packet flow is identified, by the second communication device, from the first predetermined information and second predetermined information which is extracted in the second communication device from the same packets which would have been analyzed by the first communication device if no abnormality had occurred, wherein the second predetermined information is required for identifying the same packet flow and the second predetermined information has not been received by the first communication device when detecting the abnormality.

2. The communication device according to claim 1, wherein, when transmitting the first predetermined information already extracted from the predetermined packet which is currently analyzed, the processor also transmits the flow management information on an already analyzed flow.

3. A communication device connected to a communication network as a second communication device comprising:
at least one processor which:
receives, from a first communication device, first predetermined information comprising a type of packets, a transmission source address and a transmission destination address, wherein the first predetermined information is currently extracted from a portion of packets required for identifying a packet flow by the first communication device when the first communication device detects an abnormality occurs in communication of a packet,
extracts second predetermined information comprising a type of packets, a transmission source address and a transmission destination address from the same packets, which are required for identifying the same packet flow which would have been identified by the first communication device if no abnormality had occurred, and which have not been received by the first communication device when the first communication device detects the abnormality, and
identifies, from the first predetermined information received from the first communication device and the second predetermined information, the same packet flow, as flow management information.

4. The communication device according to claim 3, wherein, the processor transmits, when detecting the packet being input from the communication network before receiving the first predetermined information from the first communication device, a signal requesting for transmission of a predetermined packet to a transmission source of the packet.

5. The communication device according to claim 3, wherein
the processor uses the flow management information generated by the second communication device and the already analyzed flow management information received from the first communication device in controlling communication of the packet, when receiving flow management information already analyzed by the first communication device as well as the first predetermined information.

6. A communication system comprising:
a first communication device comprising:
at least one first processor which:
extracts first predetermined information required for identifying a packet flow, which comprises a type of packets, a transmission source address and a transmission destination address, from each of a plurality of packets inputted from a communication network, analyzes the first predetermined information of the plurality of packets, and generates information relating to a characteristic of each flow of the packets, as flow management information, detects that an abnormality occurs in communication of the packets in the communication network, and transmits, when detecting the abnormality during flow analysis, the first predetermined information to a second communication device as a standby-system device; and the second communication device comprising:

at least one second processor which:

receives, the first predetermined information from the first communication device when the first communication device detects an abnormality occurs in communication of a packet, extracts the second predetermined information comprising a type of packets, a transmission source address and a transmission destination address from a plurality of packets, which are required for identifying the same packet flow which would have been identified by the first communication device if no abnormality had occurred, and identifies, from the first predetermined information received from the first communication device and the second predetermined information, the same packet flow as flow management information.

7. A communication method comprising:

extracting first predetermined information, which comprises a type of packets required for identifying a packet flow, a transmission source address and a transmission destination address, from each of a plurality of packets input to a first communication device, analyzing the first predetermined information of the plurality of packets, and generating information relating to a characteristic of each flow of the packets, as flow management information;

detecting that an abnormality occurs in a communication network; and transmitting, when the abnormality is detected, the first predetermined information to a second communication device as a standby system, wherein the first predetermined information is already extracted from the packets input from a communication network before the detection of the abnormality during flow analysis, as information for identifying the same packet flow, by the second communication device, from the first predetermined information and second predetermined information, wherein the second predetermined information is extracted in the second communication device from the same packets which would have been analyzed by the first communication device if no abnormality had occurred.

8. The communication method according to claim 7, wherein, when the first predetermined information which is currently analyzed is transmitted, the flow management information on an already analyzed flow is also transmitted.

9. The communication method according to claim 7, wherein the first predetermined information is received by the second communication device; and information relating to a characteristic of each flow of the packets is generated as second flow management information, from the first predetermined information received by the second communication device and the second predetermined information extracted from the packets input to the first communication device.

10. The communication method according to claim 9, wherein the second communication device transmits, when detecting the packet input to the first communication device before receiving the first predetermined information, a signal for resetting connection to a transmission source of the packet.

11. The communication method according to claim 9, wherein, when receiving the already analyzed flow management information as well as the first predetermined information, the second communication device uses the second flow management information generated by the second communication device and the received flow management information in controlling communication of the packets.

12. The communication method according to claim 7, further comprising:

receiving, from the first communication device, the first predetermined information which is currently analyzed by the first communication device when the first communication device detects an abnormality occurs in communication of a packet; and extracting second predetermined information comprising a type of packets, a transmission source address and a transmission destination address from a plurality of packets input to the second communication device from a communication network.

13. The communication method according to claim 12, wherein, when detecting the packet input to the second communication device before receiving the first predetermined information from the first communication device, a signal requesting transmission of a predetermined packet is transmitted to a transmission source of the packet by the second communication device.

14. The communication method according to claim 12, wherein, when receiving flow management information already analyzed by the first communication device as well as the first predetermined information, the flow management information generated by the second communication device and the flow management information received from the first communication device are used in controlling communication of the packets.

* * * * *